(12) United States Patent
Chiaberge et al.

(10) Patent No.: US 10,920,150 B2
(45) Date of Patent: Feb. 16, 2021

(54) PROCESS FOR THE PRODUCTION OF BIO-OIL FROM BIOMASS

(71) Applicant: ENI S.p.A., Rome (IT)

(72) Inventors: Stefano Carlo Chiaberge, Novara (IT); Mauro Burattini, Cornaredo (IT); Roberta Miglio, Oleggio (IT); Marina Cabrini, Peschiera Borromeo (IT)

(73) Assignee: ENI S.p.A., Rome (IT)

( * ) Notice: Subject to any disclaimer, the term of this patent is extended or adjusted under 35 U.S.C. 154(b) by 0 days.

(21) Appl. No.: 15/735,279

(22) PCT Filed: Jun. 17, 2016

(86) PCT No.: PCT/IB2016/053607
§ 371 (c)(1),
(2) Date: Dec. 11, 2017

(87) PCT Pub. No.: WO2016/203437
PCT Pub. Date: Dec. 22, 2016

(65) Prior Publication Data
US 2018/0163140 A1    Jun. 14, 2018

(30) Foreign Application Priority Data

Jun. 18, 2015  (IT) .................. 102015000025267

(51) Int. Cl.
*C10G 1/02*  (2006.01)
*C10G 1/00*  (2006.01)
(Continued)

(52) U.S. Cl.
CPC .............. *C10G 1/02* (2013.01); *C10G 1/008* (2013.01); *C10G 1/04* (2013.01); *C10G 1/047* (2013.01);
(Continued)

(58) Field of Classification Search
None
See application file for complete search history.

(56) References Cited

U.S. PATENT DOCUMENTS 8,877,992 B2 * 11/2014 Appel ...................... B09B 3/00
585/240
2006/0151357 A1 * 7/2006 Plopski .................. C10G 1/042
208/46
(Continued)

FOREIGN PATENT DOCUMENTS

WO    WO 2011/030196 A1    3/2011
WO    WO 2011/128741 A1    10/2011

OTHER PUBLICATIONS

International Search Report and Written Opinion dated Sep. 9, 2016 in PCT/IB2016/053607, 9 pages.
(Continued)

*Primary Examiner* — Ali Z Fadhel
(74) *Attorney, Agent, or Firm* — Oblon, McClelland, Maier & Neustadt, L.L.P.

(57) ABSTRACT

Process for the production of bio-oil from biomass comprising the following steps: (a) feeding a biomass to a liquefaction reactor, said biomass having a protein content higher than or equal to 1% by weight, preferably ranging from 5% by weight to 50% by weight, with respect to the weight (dry weight) of said biomass, a lipid content higher than or equal to 1% by weight, preferably ranging from 5% by weight to 60% by weight, with respect to the weight (dry weight) of said biomass, a pH higher than or equal to 4, preferably ranging from 4.5 to 10; (b) subjecting said biomass to liquefaction operating at a temperature ranging from 220° C. to 350° C., preferably ranging from 230° C. to 310° C., even more preferably ranging from 240° C. to 300° C., at a pressure higher than the vapour pressure of water at the temperature in which said liquefaction is carried out, for a (Continued)

time ranging from 30 minutes to 300 minutes, preferably ranging from 50 minutes to 270 minutes, obtaining a mixture comprising an oily phase consisting of bio-oil, a solid phase, a gaseous phase and an aqueous phase. The bio-oil (or bio-crude) thus obtained can be advantageously used as such, or, after optional upgrading treatments, in the production of biofuels or biocombustibles that can, in turn, be used as such or in a mixture with other fuels, for motor vehicles. Or, said bio-oil (or bio-crude) can be used in a mixture with fossil fuels (fuel oil, coal, etc.) for the generation of electric energy or heat.

7 Claims, 4 Drawing Sheets (51) Int. Cl.
 C10G 1/04 (2006.01)
 C10G 3/00 (2006.01)
 C10G 9/00 (2006.01)
(52) U.S. Cl.
 CPC ............... *C10G 3/40* (2013.01); *C10G 3/60* (2013.01); *C10G 9/00* (2013.01); *C10G 2300/1003* (2013.01); *C10G 2300/1011* (2013.01); *C10G 2300/4006* (2013.01); *C10G 2300/4012* (2013.01); *Y02P 30/20* (2015.11)

(56) References Cited

U.S. PATENT DOCUMENTS

| 2009/0062581 | A1* | 3/2009 | Appel ............... C10G 1/002 585/241 |
|---|---|---|---|
| 2010/0314241 | A1* | 12/2010 | Plopski ............... C02F 1/26 203/76 |
| 2012/0055077 | A1* | 3/2012 | Savage ............... C10L 1/02 44/307 |
| 2012/0172642 | A1 | 7/2012 | Bosetti et al. |
| 2013/0055623 | A1* | 3/2013 | Iversen ............... C10G 1/086 44/385 |
| 2013/0090487 | A1 | 4/2013 | Bosetti et al. |
| 2014/0099691 | A1* | 4/2014 | Iversen ............... C10G 1/02 435/166 |
| 2014/0275299 | A1* | 9/2014 | Bedwell ............... C01B 3/34 518/704 |

OTHER PUBLICATIONS

Summons to Attend Oral Proceedings in corresponding European Application No. 16745161.6, dated Dec. 18, 2019.
L. Freire, et al. "The passive behavior of AISI 316 in alkaline media and the effect of pH: A combined electrochemical and analytical study", Electrochimica Acta, vol. 55, 2010, pp. 6174-6181.
A. Malik, et al., "The influence of pH and chloride concentration on the corrosion behavior of AISI 316L steel in aqueous solutions", Corrosion Science, vol. 33, No. 11, 1992, pp. 1809-1827.
C. Jessen, "Stainless steel and corrosion", 2011, pp. 1-6 and 73-106.
C. Trepanier, et al., "Proceedings of SMST-2004: Effect of temperature and pH on the corrosion resistance of nitinol and stainless steel", pp. 361-366.

* cited by examiner

PROCESS FOR THE PRODUCTION OF BIO-OIL FROM BIOMASS

The present invention relates to a process for the production of bio-oil from biomass.

More specifically, the present invention relates to a process for the production of bio-oil from biomass that comprises feeding a biomass to a liquefaction reactor, said biomass having a specific content of proteins and lipids and a specific pH, subjecting said biomass to liquefaction, operating under specific temperature, pressure and time conditions, obtaining a mixture comprising an oily phase consisting of bio-oil, a solid phase, a gaseous phase and an aqueous phase.

The bio-oil (or bio-crude) thus obtained can be advantageously used as such, or, after optional upgrading treatments, in the production of biofuels or biocombustibles that can, in turn, be used as such or in a mixture with other fuels, for motor vehicles. Or, said bio-oil (or bio-crude) can be used in a mixture with fossil fuels (fuel oil, coal, etc.) for the generation of electric energy or heat.

As is known, in the European Community there is the requirement of using "components of a bio origin" for fuels or for the production of electric energy.

The existing regulatory framework on biofuels derives from the European standards "Fuel Quality Directive" (FQD 2009/30/EC) and "Renewable Energy Directive" (RED 2009/28/EC). Among the main interventions, RED 2009/28/EC imposes the introduction of "components of a bio origin" in conventional fossil fuels, up to 10% of calorific value by the year 2020. The regulatory framework is evolving, in particular, a proposal for amending RED 2009/28/EC is currently being discussed, aimed at introducing a maximum limit of 7% for biofuels from first-generation sources, i.e. deriving from sources in competition with nutrition (for example, palm oil, rape oil, soybean oil, etc.) and introducing a minimum quantity of "advanced biofuels". Among raw materials identified as the source of "advanced biofuels", biomasses deriving from sources that are not competing with food production, can be mentioned: said biomasses are better defined hereunder.

Technologies for the treatment of biomasses deriving from sources not competing with food production, in particular from organic material deriving from the differentiated collection of solid urban waste, currently used, can fall within the following four categories, in relation to the final product to be obtained:

(1) composting plants, aimed at the production of a high-quality organic soil improver destined for the agricultural and horticultural sector;
(2) anaerobic digestion plants, aimed at energy recovery with upgrading of the organic fraction to biogas;
(3) aerobic stabilization or bio-stabilization plants, aimed at pre-treatment of the organic fraction for minimizing negative effects connected with the presence of putrescible matter in landfills, or for the production of a soil improver suitable for environmental restoration known as "Stabilized Organic Fraction" (SOF);
(4) thermal treatments aimed at the recovery of matter and energy.

Thermal treatments (4) differ from the technologies indicated under items (1), (2) and (3), with respect to both the product that can be potentially obtained and also the investment required, the latter generally being much higher. Among the types of thermal treatments, the following can be mentioned, for example:

(4a) combustion, in which the biomass is transformed into energy;
(4b) gasification, in which the biomass is transformed into synthesis gas;
(4c) pyrolysis, in which the biomass is transformed into bio-oil;
(4d) liquefaction, in which the biomass is transformed into bio-oil.

Liquefaction is one of the thermal treatments for converting biomasses into bio-oil, of which the substantial difference with respect to the other thermal treatments indicated above, i.e. combustion, gasification, pyrolysis, consists in carrying out the thermal treatment directly on the wet mass and generally at a lower temperature.

The basic process that claims liquefaction has already been known since the forties'. As indicated in the internet website http://newoilresources.com/history.html, in fact, a patent was granted in 1939, relating to a process for converting wood into bio-oil, but the commercialization of the bio-oil obtained was never achieved due to the lack of engineering means and an of appropriate metallurgy.

A recent description on the evolution of the technology relating to liquefaction, from the initial publications until its current state, which comprises the effects of the operating variables (e.g., temperature, time, pressure), of the charge (e.g., biomass) at the inlet and the characterization of the bio-oil obtained, is provided by Christensen P. S. in: "*Hydrothermal Liquefaction of Waste Biomass—Optimizing Reaction Parameters*", Ph.D. Dissertation, August 2014, Aarhus University, Denmark.

A detailed description of the mechanism of the liquefaction reaction, further developed by the use of model compounds, is provided by Croce A. in: "*From Biomass to Bio-oil by Hydrothermal Treatment: a Modeling Study*", University of L'Aquila, Academic Year 2013-2015.

A review has recently been published, relating to the mode of managing liquefaction in continuous, that can be considered as being a necessary step for the passage towards managing the process on a scale of industrial interest (see Elliott D. C. et al., "*Hydrothermal liquefaction of biomass: Developments from batch to continuous process*", "Bioresource Technology" (2015), Vol. 178, pages 147-156.

The liquefaction process is generally carried out at a temperature ranging from 240° C. to 400° C.: when operating over 376° C., which represents the critical temperature of water, the liquefaction takes place under "supercritical" conditions; when operating below this temperature, the liquefaction takes place under "subcritical" conditions; and when operating at a temperature ranging from 330° C. to 350° C., the liquefaction takes place under "near-critical" conditions.

The liquefaction of biomass under "subcritical" conditions is generally carried out at a temperature ranging from 240° C. to 330° C., for a time ranging from 5 minutes to 120 minutes and at a pressure ranging from 40 bar to 150 bar, obtaining a mixture comprising an oily phase composed of bio-oil, an aqueous phase, a solid phase in which the inert and inorganic part present in the biomass fed to liquefaction is prevalently concentrated, and a gaseous phase. Said gaseous phase and said aqueous phase are generally subjected to further treatments before being re-emitted into the environment. Among the critical aspects that hinder the applicative diffusion of the liquefaction of biomass, there is also the presence of said solid phase comprising organic and/or inorganic compounds that can increase encrustations caused by the fluids obtained from the liquefaction, with corrosion effects, in addition to the corrosiveness associated with both the nature of the above fluids, and to the combined generally operating temperature-pressure, which in itself is critical for the construction materials of the reactors normally used for said liquefaction.

Liquefaction processes currently in the development or demonstrative stage are known in the art. Liquefaction processes characterized by the highest degree of development are called "Changing Word Tech" (CWT) and "Hydro-Thermal Upgrading" (HTU).

In this respect, the first plant on an industrial scale based on the "Changing World Tech" (CWT) developed on the basis of American U.S. Pat. No. 5,269,947, was constructed at Carthage (Mo.), and was capable of treating 200 t/day-250 t/day of waste deriving from the transformation industry of turkeys, transforming them into diesel, fertilizing products and coal. Said plant suffered numerous stoppages and never reached a full operational capacity. In 2009, the owning company of the plant declared bankruptcy (Internet site http://www.treehugger.com/corporate-responsibility/bad-economy-production-problems-gobble-turkey-diesel-company.html). In 2011, the plant acquired by a Canadian company, Ridgeline Energy Services, was restarted, and remained operative for a couple of years (Internet site http://www.carthagepress.com/article/20130416/NEWS/130419181) and was subsequently stopped for losses (Internet site http://pdfserver.amlaw.com/cli/affidavit/oca_affidavit_650841_2013_311.pdf). In the report filed at the New York Court on Jan. 16, 2015 (Internet site http://pdfserver.amlaw.com/cli/affidavit/oca_affidavit_650841_2013_311.pdf), details of a management and technical nature relating to the plant are reported, and among the problems of a technical nature, it appears (see page 6) that the bio-oil produced by the plant created problems for the final users of said bio-oil (i.e. Erving Paper Company, APAC and Omega Proteins), substantially due to the corrosiveness of the same.

Numerous other publications describe the above-mentioned "Changing World Tech" (CWT) technology: in this respect, a study of 2009 on the part of Miller G.: "*Energy Supply—Production of Fuel from Agricultural and Animal Waste*" (Internet site www.osti.gov/scitech/servlets/purl/950036), can be mentioned, in which, on page 20, an acidity value of the bio-oil [TAN number ("Total Acid Number") equal to 113] is also indicated, showing how the problems of corrosiveness of a fluid are often associated with the acidity of the same.

A high development degree was also achieved by the "HydroThermal Upgrading" (HTU) technology of Shell, which has been described in publications since the eighties' such as, for example, by Goudriaan F. et al., in: "*Liquid fuels from biomass via a hydrothermal process*", Chemical Engineering Science (1990), Vol. 45(8), pages 2729-2734. Said technology underwent a sharp rise in value towards the end of the nineties' reaching the pilot plant scale in 2004, capable of treating 100 kg/h of biomass, as described, for example, by Jansen P. in: "*Innovative biofuel production processes: Fischer-Tropsch synthesis and Hydro Thermal Upgrading*", EU-China workshop on liquid biofuel, Beijing, 4-5 Nov. 2004 (Internet site http://ec.europa.eu/research/energy/pdf/35_peter_jansen_en.pdf). With respect to said "HydroThermal Upgrading" (HTU) technology, Jansen P. also indicates the following operating conditions:

temperature: 300° C.-350° C.;
reaction time: 5 minutes-20 minutes;
in the presence of water.

Furthermore, American patent application US 2013/0079565 describes a hydrothermal conversion process of biomass to hydrocarbon products. In particular, it describes a process for the conversion of biomass to high-value hydrocarbon products which comprises introducing a biomass, an effective quantity of water, and an effective quantity of a co-feed, into a reactor operating at a temperature ranging from about 200° C. to about 500° C., at a pressure higher than the vapour pressure of water in said reaction reactor, with a residence time ranging from about 1 minute to about 30 minutes.

A book on the thermochemical conversion of biomass has also been recently published: "*Recent Advances in Thermochemical Conversion of Biomass*" (2015), Chapter 10, pages 269-291, Ashok Pandey Ed., Thallada Bhaskar, Michael Stöcker, Rajeev Sukumaran Elsevier B.V (Internet site http://dx.doi.org/10.1016/B978-0-444-63289-0.00010-7). In said chapter, among the significant aspects in the development of the liquefaction process of biomass, the aspect relating to the aggressiveness of water when operating under "subcritical" conditions is indicated, with the necessity of further developing the adequate selection of the construction materials: details on the choices to be made for limiting corrosion, however, are not provided.

A parallel experience is also that of the company SCF Technologies, which developed the "CatLiq" process, for the transformation of organic waste into bio-oil, closed in 2011. A recently formed company, Steeper Energy took over said process and installed a pilot liquefaction plant in Denmark, at the University of Aalborg, which operates through the proprietary technology "Hydrofaction™" capable of transforming organic waste with a low energy value into products with a high-energy value operating under "supercritical" conditions of the water (as indicated in the Internet site http://steeperenergy.com/hydrofaction).

Information relating to the behaviour of materials with which liquefaction reactors are constructed, is extremely limited. Christensen P. S. in: "*Hydrothermal Liquefaction of Waste Biomass—Optimizing Reaction Parameters*", Ph.D. Dissertation, August 2014, Aarhus University, Denmark, cited above, describes, for example, a reactor produced from a special corrosion-resistant alloy, i.e. X22CrMoV, (see page 27).

Most studies relating to materials with which liquefaction reactors are constructed are associated with the production of bio-oil obtained from high-temperature pyrolysis: the bio-oil obtained from pyrolysis, however, has a different chemical composition from that obtained from liquefaction. In this case, in fact, the problems of wet corrosion do not relate to the reactor but to the areas in which the bio-oil is cooler, such as transportation, storage plants and refining systems, as described, for example, in "*Effect of Bio-oil on Materials Used in Production and Storage*" (14 May 2013), NABC—National Advanced Biofuels Consortium.

Other information relating to corrosion caused by bio-oil obtained from pyrolysis can be found, for example, in Keiser J. R. et al., "*Corrosion Of Containment Materials By Pyrolysis Oils*" (Internet site http://www.tappi.org/content/events/11BIOPRO/11.2Keiser.pdf)

Unlike the bio-oil obtained from pyrolysis, the bio-oil obtained from liquefaction generally has a high acidity defined by a TAN number ("Total Acid Number") which indicatively ranges from 1 mgKOH/g to 150 mgKOH/g.

Studies available in literature on the selection of suitable materials for oils characterized by a high acidity [i.e. high TAN number ("Total Acid Number")] relate to materials used in the treatment of crude oils or of mixed crude oil/bio-oil systems. Crude oils characterized by a TAN number ("Total Acid Number") >1.5 mgKOH/g are considered corrosive within a temperature range of 230° C.-400° C. There are also other factors that can make crude oils with the same value of TAN number ("Total Acid Number") differ in terms of corrosiveness, such as, for example: the content of naphthenic acids present, the presence of reactive sulfur (mercaptans, sulfides, etc.), the temperature at which the treatment is carried out. The necessity of treating acid crude oils, characterized by a low cost, in any case represents an investment for refiners in the use of steel alloys with a high nickel (Ni) content, typically Inconel® alloy 625, which are resistant to corrosion also in the presence of a high acidity and of chlorides, as indicated, for example, by Nagi-Hanspal I. et al., in "*Corrosion control with high-acid crudes*", PTQ Q3 2013, pages 115-121 (Internet site www.eptq.com): this approach is considered the best, even if costly.

Alternatively, chemical inhibition is one of the main methods applied industrially for controlling corrosion in the treatment of crude oils, as described, for example, by Di Iorio C. e altri, in "*Evaluation of environmentally friendly corrosion inhibitors vs traditional corrosion inhibitors in oil and gas industry*", EUROCORR 2014, European Corrosion Congress, Pisa, Italy; Rajasekar A. et al., in "*Biodegradation of corrosion inhibitors and their influence on petroleum product pipeline*", "Microbiological Research" (2007), Vol. 162, pages 355-368.

In order to prevent and/or limit the corrosion caused by bio-oils obtained from the liquefaction of biomass which, as specified above, are characterized by a high acidity, also taking inspiration from what is indicated above for the treatment of crude oils, various strategies can be adopted, such as, for example:

(a1) removal of the corrosive compounds;

(a2) selection of special corrosion-resistant steels with a high nickel (Ni) content;

(a3) addition of chemical compounds;

(a4) anodic or cathodic polarization of the material.

As far as the removal of corrosive compounds (a1) is concerned, studies relating to hydrotreatment methods of bio-oil for reducing the acidity by removing most of the groups containing oxygen present in the same, are known, as described, for example, by Eliott D. C. in "*Historical developments in Hydroprocessing Bio-oils*", Energy & Fuels (2007), Vol. 21, pages 1792-1815. Said method, however, relates to the treatment of bio-oil obtained after liquefaction and consequently does not solve the problem of corrosion in the liquefaction reactor.

With respect to the selection of corrosion-resistant materials (a2), in particular in the case of corrosive environments in which the overlapping between the characteristics of the environment and the high temperature make corrosion particularly severe for the application of conventional stainless steel (generally austenitic steel of the series AISI 300 such as, for example, AISI 304, AISI 304L, AISI 316, AISI 316L), as for the liquefaction of biomasses carried out in "subcritical" conditions, two different types of steel alloys with a high nickel (Ni) content can be taken into consideration, such as, for example, the alloy Hastelloy C276, the alloy Hastelloy X 22CrMoV, the alloy Mo6 and the alloy Inconel® alloy 625, the latter to be used in the case of high temperatures (about 300° C.). The high costs relating to the use of special steel alloys, however, hinder the development of bio-oil production technologies. The following Table indicates the compositions of the steels listed above.

TABLE

| STEEL | C (weight %) | Cr (weight % o) | Ni (weight %) | Mo (weight %) | Mn (weight %) |
|---|---|---|---|---|---|
| AISI 304 | <0.08 | 18 | 8 | — | — |
| AISI 304L | <0.03 | 18 | 8 | — | — |
| AISI 316 | <0.08 | 18 | 10 | 2 | — |
| AISI 316L | <0.03 | 18 | 10 | 2 | — |
| Inconel ® alloy 625 | 0.1 | 21.5 | 58 | 9 | 0.5 |
| Mo6 | <0.02 | 20 | 18 | 6 | 1 |
| Hastelloy C276 | 0.01 | 15.5 | 57 | 16 | 1 |
| Hastelloy X 22CrMoV | 0.1 | 22 | 47 | 9 | 1 |

As far as the addition of corrosion inhibitors (a3) is concerned, as their action mechanism is complicated and often not completely known, in order to obtain satisfactory results, they must have a specific formulation and their concentration during the test must be constantly monitored. As described, for example, by Nagi-Hanspal I. et al., in "*Corrosion control with high-acid crudes*", PTQ Q3 2013, pages 115-121, Internet site www.eptq.com), cited above, the most traditional corrosion inhibitors used in the treatment of crude oils with a high acidity (TAN number >1.5 mgKOH/g), within a temperature range of 230° C.-400° C., called "High Temperature Corrosion Inhibitors" (HTCI), are mono-, di- or tri-phosphate esters which, at the operating temperatures, decompose into phosphoric acid which reacts with the metallic surface forming a protective layer of iron phosphate: as indicated therein, however, corrosion is avoided but the probability of fouling the reactor is increased, due to the formation of insoluble iron phosphate. Furthermore, the reaction is activated by the temperature, consequently at temperatures lower than 230° C., corrosion remains a risk factor and the decomposition must be carefully monitored. It is also indicated therein that Dorf Ketal has developed proprietary polymeric inhibitors based on sulfur and phosphorous that are thermally stable and contain phosphorous in a quantity lower than 5%: said inhibitors are capable of adhering to the metallic surfaces by chemisorption rather than by salt reaction, and consequently the above problem of fouling is avoided.

It is known that corrosion inhibitors used in the treatment of crude oils can also be of an organic nature. Said corrosion inhibitors of an organic nature are generally composed of a polar group mainly based on a group containing nitrogen, of the amine, amide, imidazoline and quaternary ammonium type, bound to a hydrophobic chain (a surfactant-type structure): the polar part is bound to the metallic surface, whereas the hydrophobic part remains in the fluid, thus creating a protective barrier.

Alternatively, reactive compounds of sulfur (for example, sulfides, disulfides, mercaptans) can be used as corrosion inhibitors, which produce a film on the metallic surface (sulfidization): in this case, however, critical aspects can arise due to changes in corrosiveness that cannot be easily predicted and the emission of sulfur compounds.

With respect to the anodic or cathodic polarization of the material (a4), in this case, an electric protection is created. In cathodic protection, a current in a cathodic direction is imposed on the material, which lowers its operating voltage: said cathodic protection can be obtained by means of voltage generators or power supplies (impressed current protection) or by galvanic coupling with a material having an anodic behaviour with respect to the material protected (sacrificial anode protection). In anodic protection, a current in an anodic direction is imposed on a material with an active-passive behaviour, which brings the voltage of the material to a passivity area: said anodic protection can be obtained by means of an external source or by coupling with a material having a cathodic behaviour.

From what is indicated above, problems relating to corrosion of the liquefaction reactor of biomass for the production of bio-oil mainly due to generalized corrosion, erosion-corrosion, localized corrosion with the formation of small cavities (pitting) and crevices, tenso-corrosion such as that due to the presence of chlorides ("Chloride Stress Corrosion Cracking"—CSCC) and/or of hydrogen sulfide ("Sulfide Stress Corrosion Cracking"—SSCC), are still of great interest.

The Applicant has considered the problem of finding a process for the production of bio-oil from biomass which allows to improve the corrosion resistance of the liquefaction reactor. In particular, the Applicant has considered the problem of finding a process for the production of bio-oil from biomass that does not require the use of the strategies indicated above.

The Applicant has now found that the production of bio-oil from biomass (i.e. the conversion of biomass into liquid products that can be used as such or after optional upgrading treatments, as biocombustibles and/or biofuels), can be advantageously implemented by means of a process that comprises feeding a biomass, having a specific content of proteins and lipids and a specific pH, to a liquefaction reactor, subjecting said biomass to liquefaction operating under specific temperature, pressure and time conditions, obtaining a mixture comprising an oily phase consisting of bio-oil, a solid phase, a gaseous phase and an aqueous phase.

In particular, the Applicant has found that the above process allows secondary products to be obtained from the liquefaction of biomass, such as, for example, aliphatic compounds and alkylaromatic compounds, in particular fatty acid amides and alkylaromatic compounds containing heteroatoms [for example, nitrogen (N), oxygen (O)], that are capable of acting as corrosion inhibitors, consequently allowing the use of liquefaction reactors made of conventional stainless steel such as, for example, austenitic steel of the series AISI 300 such as, for example AISI 304L, AISI 316L, without having to resort to the use of steel alloys with a high nickel content, with a considerable saving of process costs. Said process also allows to avoid the removal of corrosive compounds, the addition of chemical compounds, the anodic or cathodic polarization of the material, with a consequent saving of time and process costs.

The bio-oil (or bio-crude) thus obtained can be advantageously used as such, or after optional upgrading treatments, in the production of biofuels or biocombustibles that can, in turn, be used as such or in a mixture with other fuels, for motor vehicles. Or, said bio-oil (or bio-crude) can be used in a mixture with fossil fuels (fuel oil, coal, etc.) for the generation of electric energy or heat.

An object of the present invention therefore relates to a process for the production of bio-oil from biomass comprising the following steps:
(a) feeding a biomass to a liquefaction reactor, said biomass having a protein content higher than or equal to 1% by weight, preferably ranging from 5% by weight to 50% by weight, with respect to the weight (dry weight) of said biomass, a lipid content higher than or equal to 1% by weight, preferably ranging from 5% by weight to 60% by weight, with respect to the weight (dry weight) of said biomass, a pH higher than or equal to 4, preferably ranging from 4.5 to 10;

(b) subjecting said biomass to liquefaction operating at a temperature ranging from 220° C. to 350° C., preferably ranging from 230° C. to 310° C., even more preferably ranging from 240° C. to 300° C., at a pressure higher than the vapour pressure of water at the temperature in which said liquefaction is carried out, for a time ranging from 30 minutes to 300 minutes, preferably ranging from 50 minutes to 270 minutes, obtaining a mixture comprising an oily phase consisting of bio-oil, a solid phase, a gaseous phase and an aqueous phase.

For the aim of the present description and of the following claims, the definitions of the numerical ranges always comprise the extremes unless otherwise specified.

For the aim of the present description and of the following claims, the term "comprising" also includes the terms "that essentially consist of" or "that consists of".

For the aim of the present description and of the following claims, the term "biomass" indicates:
   solid urban waste that can be selected, for example, from: organic material deriving from differentiated waste collection, organic material selected from undifferentiated solid urban waste, or mixtures thereof; or mixtures of said organic material with pruning cuttings and/or agricultural residues;
   primary and biological sludge produced in purification plants of wastewater;
   residues and/or waste deriving from agricultural and/or zootechnical activities;
   residues and/or waste deriving from the agro-food industry;
   residues and/or waste deriving from agricultural processing, forestry and/or silviculture;
   microalgae and/or macroalgae as such or after lipid extraction;
   cyano-bacteria as such or after lipid extraction; or mixtures thereof.

It should be pointed out that if the pH of the biomass in step (a) is outside the desired range, said pH can be modified by the addition of at least one compound having an acid or base nature, having inert or catalytic properties in the subsequent liquefaction step (b), such as, for example: calcium oxide, iron oxide, nickel oxide, molybdenum oxide magnesium oxide, zirconium oxide, cerium oxide, titanium oxide, or mixtures thereof; calcium hydroxide, magnesium hydroxide, sodium hydroxide, potassium hydroxide, or mixtures thereof; sodium carbonate, potassium carbonate, nickel carbonate, or mixtures thereof; sodium bicarbonate, potassium bicarbonate, or mixtures thereof; solid residue or ashes deriving from the liquefaction of biomass, or mixtures thereof; or mixtures thereof.

Compounds that can be used as catalysts and that are normally adopted in the liquefaction of biomass are described, for example, by Zhang Y. in "*Hydrothermal Liquefaction to Convert Biomass into Crude Oil*", "Biofuel from Agricultural Wastes and Byproducts" (2010), Blascheck H. P., Ezeji T. C and Scheffran J. Eds, Blackwell Publishing (Internet site http://age-web.age.uiuc.edu/bee/research/IntroHTL.pdf).

According to a preferred embodiment of the present invention, said liquefaction step (b) can be carried out at a pressure ranging from 25 bar to 110 bar, preferably ranging from 30 bar to 100 bar.

Said biomass can be optionally subjected to pre-treatment before being subjected to said liquefaction step (b).

According to a preferred embodiment of the present invention, said biomass can be treated by subjecting it to a preliminary homogenization, grinding or sizing process before being subjected to said liquefaction step (b).

According to a preferred embodiment of the present invention, said biomass is wet. Said biomass preferably has a water content higher than or equal to 50% by weight, preferably ranging from 55% by weight to 80% by weight, with respect to the total weight of said biomass.

Said liquefaction step (b) can be carried out in liquefaction reactors known in the art such as, for example, autoclaves, tubular reactors, tubes, stirred reactors, reactors with internal recirculation. In particular, said liquefaction step (b) can be carried out in conventional stainless steel reactors, such as, for example, austenitic steel of the series AISI 300 such as, for example AISI 304L, AISI 316L, preferably AISI 316L.

Said liquefaction step (b) can be carried out operating in various modes such as, for example, batchwise or in continuous.

Considering that the thermal energy necessary in said liquefaction step (b) can totally or partially derive from the thermal recovery or from the combustion of traditional energy carriers, such as for example methane gas, LPG, mineral oil, coal, etc., it is not excluded that the thermal energy can derive from other renewable sources such as, for example, solar energy, biomass, or fuels deriving from biomass such as, for example, biogas, biomethane, syngas, bio-liquids, bio-solids.

The oily phase, the solid phase and the aqueous phase included in the mixture obtained in said liquefaction step (b), can be separated by means of techniques known in the art such as, for example, gravitational separation (e.g., sedimentation, decanting), filtration, centrifugation. Said phases are preferably separated by gravitational separation or by centrifugation.

As far as the gaseous phase is concerned, the following procedure is adopted. Said gaseous phase, which is equal to about 4% by weight-25% by weight with respect to the weight (dry weight) of said biomass, is mainly composed of carbon dioxide (about 80% in moles-98% in moles) and of a mixture of hydrocarbons having from 1 to 4 carbon atoms such as, for example, methane, ethane, ethylene, propane, propylene, butene, or other gases such as, for example, carbon monoxide, hydrogen, hydrogen sulfide, alkylthioethers, mercaptans, other sulfur compounds (about 2% in moles-20% in moles). Said gaseous phase, after separation, which can be carried out, for example, by depressurization of the liquefaction reactor in which said liquefaction step (b) is carried out before sending the mixture obtained (oily phase+solid phase+aqueous phase) in said liquefaction step (b) for separation, is generally sent for further treatments in order to upgrade its combustible organic component and make it compatible with emission into the atmosphere.

It should be pointed out that the solid phase, which generally comprises ashes and inert materials (said ashes and inert materials comprising, for example, carbonates and mixed phosphates of calcium, sodium and magnesium, iron oxides, silica and organic residues of a carbonaceous nature), depending on the final use of the bio-oil and the transformation process to which it is subjected, may not be separated from the mixture obtained in said liquefaction step (b). If said bio-oil is subjected to hydrotreating, for example, using the EST technology ("Eni Slurry Technology"), described in detail in the following Italian patent applications: MI95A001095, MI2001A001438, MI2002A002713, MI2003A000692, MI2003A000693, MI2003A002207, MI2004A002445, MI2004A002446, MI2006A001512, MI2006A001511, MI2007A001302, MI2007A001303, MI2007A001044, MI2007A001045, MI2007A001198, MI2008A001061, said solid phase does not have to be separated and consequently only the aqueous phase is separated, operating as described above.

The aqueous phase obtained after separation comprises part of the organic material included in said biomass. Said aqueous phase can generally have a content of organic material higher than or equal to 2% by weight, preferably ranging from 5% by weight to 15% by weight, with respect to the total weight of said aqueous phase, equivalent to a conversion ranging from 15% by weight to 50% by weight, with respect to the weight (dry weight) of the biomass subjected to liquefaction in the above step (b).

The bio-oil obtained through the above process can be sent to subsequent processing steps in order to transform it, for example, into biofuels or biocombustibles by means of upgrading treatments known in the art such as, for example, hydrogenation, deoxygenation, hydrocracking, cracking, hydrotreating carried out by means of the EST technology ("Eni Slurry Technology") indicated above.

EXAMPLES 1-4 (CORROSION TEST IN THE LIQUEFACTION REACTOR)

A corrosion test was carried out in the liquefaction reactor. For this aim, AISI 304L and AISI 316L steel U-bend test-samples type A were obtained according to the standard ASTM G30-97 (2009). The above test-samples were then smoothed with abrasive paper up to 1,200 grit and U-bent over a diameter of 10 mm by means of a specifically produced punch and mould, again operating in accordance with the above-mentioned standard ASTM G30-97 (2009). Before being bent, the test-samples were initialled, degreased in acetone and ultrasounds and weighed with an analytical balance having an accuracy of ±0.1 mg.

Figure 1:
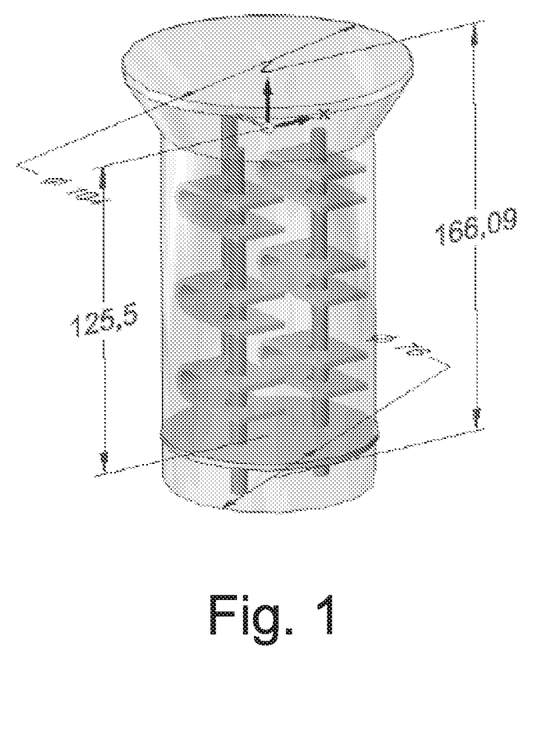
FIG. 1 shows a sample-holder produced as described in the Examples.

A sample-holder was also produced (shown in FIG. 1 in which the measurements are indicated in mm) to which three pairs of U-bend test-samples obtained as described above, were fixed, at a different height, so as to optionally expose them to different phases produced in the liquefaction reactor, if stratified. The sample-holder with the test-samples was immersed in an autoclave made of Hastelloy C276 having a nominal volume of 1 litre, which forms the liquefaction reactor. 400 g of wet organic fraction of solid urban waste (SUW) previously homogenized by means of a cutting mill were fed into the same autoclave by means of a suitable dosing system: the homogenization allowed a creamy product to be obtained with particles having dimensions lower than 1 mm.

An aliquot of the homogenized product (6 g) was anhydrified by drying in an oven, under vacuum, at 60° C., in order to determine its dry weight which proved to be equal to 29.9% by weight. The macro-composition of the homogenized product as such and after anhydrification is indicated in Table 1. Table 1 also shows the pH value of said homogenized product.

TABLE 1

| SUW | Lipids (%)* | Carbohydrates (%)* | Proteins (%)* | Ashes (%)* | Water (%)* | Total (%)* | pH |
|---|---|---|---|---|---|---|---|
| As such | 8.9 | 11.7 | 7.6 | 1.6 | 70.1 | 100 | 6.5 |
| Anhydrous | 29.8 | 39.3 | 25.5 | 5.4 | 0 | 100 | n.m.** |

*weight % with respect to the total weight of the homogenized product (As such) or with respect to the total weight of the homogenized product after anhydrification (Anhydrous);
**not measurable After creating an inert atmosphere inside the autoclave by washings with nitrogen, the autoclave was rapidly heated so as to reach the desired internal temperature: the whole unit was maintained at said temperature, for the desired time, after which the maximum pressure reached ($P_{MAX}$) was recorded. The temperature, time, maximum pressure ($P_{MAX}$) and type of steel of the various tests are indicated in Table 2.

TABLE 2

| Example | Temperature (%) | $P_{MAX}$ (bar) | Time (minutes) | Material test-samples |
|---|---|---|---|---|
| 1 | 240 | 44 | 54 | AISI 316L |
| 2 | 240 | 40 | 250 | AISI 316L |
| 3 | 300 | 90 | 96 | AISI 316L |
| 4 | 240 | 40 | 263 | AISI 304L |

At the end, the autoclave was left to cool and when room temperature (25° C.) had been reached, the residual pressure was measured in order to calculate the incondensable gases that had developed during the test.

The residual pressure was then discharged by depressurization and the discharged gaseous phase was sampled in a bag in order to subject it to analysis. Said gaseous phase was analyzed separately by means of gas-chromatographic techniques, proving to be equal to 6%-12% by weight with respect to the weight (dry weight) of the initial biomass (i.e. homogenized product fed), in relation to the liquefaction conditions indicated in Table 2. The analysis showed that the gaseous phase was composed for over 95% in moles of carbon dioxide, <2% in moles of carbon monoxide and hydrogen, <1% in moles of hydrocarbons, such as methane, ethane, ethylene, propane, propylene and butenes, <1% in moles of other gases such as hydrogen sulfide, methyl-mercaptan, ethyl-mercaptan, dimethylsulfide, carbonyl sulfide and other sulfur compounds not identified, in addition to traces of ammonia. The concentration of oxygen optionally present in the gas phase is always below the threshold detectable by the gas-chromatograph (0.1% in moles).

The autoclave was washed with nitrogen and subsequently opened to recover the test-samples that were treated manually to eliminate any optional solid residues remaining on them and on the sample-holder, then washed with ethyl acetate and further cleaned with acetone and ultrasounds.

After the above treatments, the test-samples were subjected to the following analyses:
weight loss of the test-sample: the test-sample was weighed before (the two test-samples were weighed in each position) and after the test (results obtained reported in Table 3);
calculation of the corrosion rate calculated as indicated hereunder (results obtained reported in Table 3).
The corrosion rate was calculated according to the following formulae:
exposed surface of the test-sample S (expressed in cm$^2$) corresponding to the total side surface, minus the area of the holes and plus the inner side area of the holes:

$$S = l \cdot l_a \cdot 2 + (l + l_a) \cdot s \cdot 2 - 4 \cdot \frac{d^2}{4}\pi + 2 \cdot s \cdot d\pi$$

wherein:
l=length of test-sample equal to 8.0 cm;
$l_a$=width of test-sample equal to 2.0 cm;
s=thickness of test-sample equal to 0.25 cm;
d=holes diameter equal to 1.0 cm;
π=constant equal to 3.14;
corrosion rate v (expressed in μm/year):

$$v = \frac{DP \cdot 365(\text{days/year}) \cdot 24(\text{hours/day}) \cdot 10000(\mu m/cm)}{1000(mg/g)\text{density} \cdot S \cdot t}(\mu m/\text{year})$$

wherein:
DP=weight loss of the test-sample (mg);
density=density of the test-sample (g/cm$^3$);
t=exposure time (h);
S=exposed surface of the test-sample (expressed in cm$^2$) calculated as described above.

It should be pointed out that the corrosion rates indicated in Table 3, which are lower than 20 μm/year, are lower than the values normally tolerated. There are in fact corrosion resistance tables, used as guidelines for selecting metallic materials in the presence of chemical compounds and in relation to the temperature, which are defined on the basis of reliable laboratory data available and to be considered as a recommendation basis, as indicated, for example, on the internet site http://www.tempco.it/wp-content/uploads/2012/12/corrosione.pdf. In said tables, stainless steels are considered as being resistant to uniform corrosion in liquid or wet environments if the corrosion rate does not exceed 0.1 mm/year. In particular, the corrosion resistance is classified as follows:
excellent: materials with a corrosion rate lower than 0.13 mm/year;
good: materials with a corrosion rate ranging from 0.126 mm/year to 0.5 mm/year;
poor: materials with a corrosion rate ranging from 0.5 mm/year to 1.26 mm/year.

Figure 2:
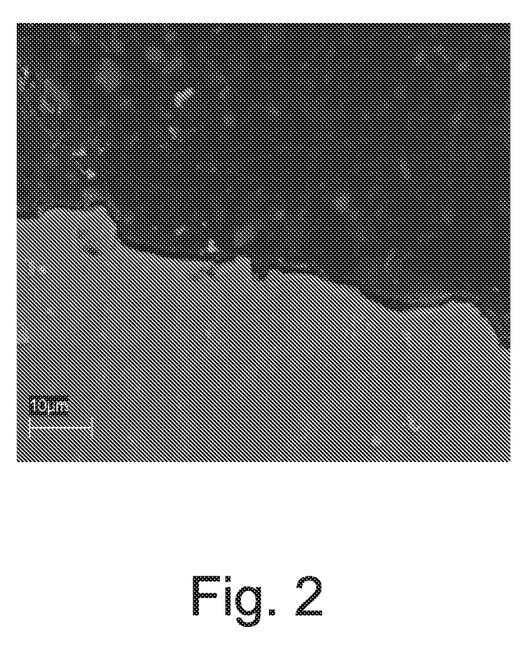
FIG. 2 shows defects in Example 1 have extremely small dimensions, less than 10 μm.

Furthermore, in order to verify the depth of the attacks present, the test-sample of Example 1, positioned at an intermediate height, was sectioned along the longitudinal axis, the ends were then cut and it was englobed in hot polyester resin. It was then polished with metallographic cards and subsequently with diamond paste, until it had a mirror surface. A thin layer of gold (50 nm) was deposited on the test-sample thus prepared to allow it to be observed with a Scanning Electronic Microscope (SEM) under high vacuum: FIG. 2 shows how these defects have extremely small dimensions, less than 10 μm.

It should be noted that no breakage or presence of cracks due to corrosion under stress was observed in any of the U-bend test-samples subjected to the above tests (Examples 1-4): said evaluation was carried out by observation with an optical viewer up to 50 magnifications.

TABLE 3

| Example - Position of test-sample | Initial weight of test-sample (g) | Weight variation of test-sample (mg) | Corrosion rate (μm/year) |
|---|---|---|---|
| 1 - high position | 25.89911 | −1.64 | 9.5 |
|  | 25.93416 | −1.45 | 8.4 |
| 1 - medium position | 25.71319 | n.d. | n.d. |
|  | 25.40102 | −1.66 | 9.6 |
| 1 - low position | 25.69001 | −1.90 | 11.0 |
|  | 23.31027 | −2.63 | 15.2 |
| 2 - high position | 25.39030 | −8.16 | 10.2 |
|  | 25.63747 | −8.00 | 10.0 |
| 2 - medium position | 25.28610 | −3.47 | 4.3 |
|  | 25.15848 | −2.15 | 2.7 |
| 2 - low position | 25.22749 | −3.26 | 4.1 |
|  | 24.04689 | −3.13 | 3.9 |
| 3 - high position | 25.31946 | −2.87 | 9.4 |
|  | 24.74700 | −3.56 | 11.6 |
| 3 - medium position | 25.33724 | 4.11(*) | n.d. |
|  | 25.94607 | 2.79(*) | n.d. |
| 3 - low position | 25.91014 | 9.50(*) | n.d. |
|  | 25.71712 | 10.73(*) | n.d. |
| 4 - high position | 25.79420 | −9.89 | 11.8 |
|  | 24.76584 | −6.99 | 8.3 |
| 4 - medium position | 25.74405 | −2.72 | 3.2 |
|  | 25.95623 | −4.39 | 5.2 |
| 4 - low position | 25.40773 | −4.39 | 5.2 |
|  | 26.16785 | −9.89 | 11.8 |

(*)dirty test-sample;
n.d.: not determined

EXAMPLE 5 (CORROSION TEST IN THE LIQUEFACTION REACTOR BY MEANS OF THE "SLOW STRAIN RATE" TECHNIQUE)

The "slow strain rate" technique was used as a rapid technique to highlight the onset conditions of stress corrosion cracking due to the presence of chlorides ("Chloride Stress Corrosion Cracking"—CSCC) and/or hydrogen sulfide ("Sulfide Stress Corrosion Cracking"—SSCC).

The test was carried out according to the standard ASTM G129-00 (2013). In this respect, the test-sample to be evaluated was subjected to traction and deformed until to breakage. The test was carried out in both an inert atmosphere, and in an aggressive atmosphere, with a strain rate equal to $10^{-5}$ s$^{-1}$, which was such as to allow the synergic interaction between environment and stress, which is at the basis of stress corrosion phenomena. Various parameters were obtained from the test deriving from a comparison of the tests carried out in an aggressive environment with respect to those carried out in an inert environment (in particular, in air, considered as being a non-aggressive environment and therefore inert, for steel of the series AISI 300). In this case, the parameters obtained were: elongation at break and reduction of area, which were measured on the test-sample after breakage of the test-sample itself.

The elongation at break in percent (A %) was calculated as follows:

$$(A \%) = [(l_f - l_o)/l_o] \cdot 100$$

wherein:

$l_o$ represents the initial length of the test-sample subjected to traction;

$l_f$ represents the final length (after breakage) of the test-sample subjected to traction.

The reduction area in percent (S %) was calculated as follows:

$$(S \%) = [(S_o - S_u)/S_o] \cdot 100$$

wherein:

$S_o$ represents the initial section of the test-sample subjected to traction;

$S_u$ represents the breakage section of the test-sample subjected to traction.

Figure 3:
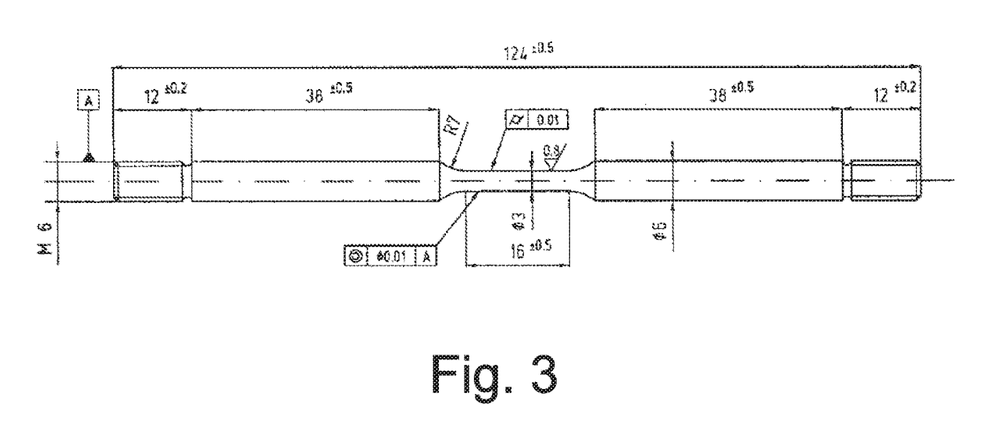
FIG. 3 shows the design of the test-samples made on the basis of the above standard ASTM G129-00 (2013) (measurements indicated are in mm).

The design of the test-samples was made on the basis of the above standard ASTM G129-00 (2013) (as shown in FIG. 3, in which the measurements indicated are in mm).

The autoclave used for the test was produced in Hastelloy C and had an internal volume of about 500 ml. 430 g of homogenized product having the macro-composition and pH indicated in Table 1, were charged into the autoclave and put in contact with the test-sample: test-sample in stainless steel AISI 304L [Example 5 (a)] and test-sample in stainless steel AISI316L [Example 5 (b)].

After verifying the sealing of the autoclave with compressed air at 6 bar and bringing it to atmospheric pressure, the autoclave was rapidly heated so as to reach an internal temperature of 250° C. and consequently, a pressure due to the vapour pressure of the compounds in addition to the formation of incondensable gases, equal to about 70 bar. The traction of the test-sample (low strain rate test start) was initiated when said temperature had been reached and set so as to obtain a constant strain rate equal to $10^{-5}$ s$^{-1}$: after about 6 hours under this condition, the breakage of the test-sample was observed.

At the end, the autoclave was left to cool and, when a temperature of 60° C. had been reached, the residual pressure was discharged by depressurization. The autoclave was then washed with nitrogen and subsequently opened to recover the test-sample which was treated manually to eliminate any optional solid residues remaining on it.

In order to have a comparison with the inert atmosphere, the tests were carried out under the same operating conditions of temperature and strain rate also in air, at atmospheric pressure.

The elongation at break values in percent (A %) and the reduction of area in percent (%), for the above test-samples are indicated in Table 4. Table 4 also indicates the embrittlement indexes calculated as specified hereunder.

The mixture obtained comprising bio-oil, aqueous phase and solid phase remaining inside the autoclave was subjected to separation by demixing between water and bio-oil to recover the aqueous phase and with the subsequent addition of ethyl acetate to solubilize the bio-oil to enable it to be separated from the remaining aqueous phase and solid phase which was insoluble in said solvent. The suspension obtained was filtered on paper and the solvent/bio-oil mixture obtained was subjected to evaporation to recover the bio-oil; the recovered bio-oil was subjected to an analysis protocol to determine the content of the main compounds present as described hereunder in Example 6.

The test-samples were washed with ethyl acetate to remove the products selectively anchored on their surface: the ethyl acetate obtained from said washing was analyzed as described hereunder in Example 7.

TABLE 4

|  | Air (250° C.-40 bar) | Homogenized product (250° C.-40 bar) | Embrittlement index[*] |
|---|---|---|---|
| Strain rate ($s^{-1}$) | $10^{-5}$ | $10^{-5}$ |  |
|  |  | (S %) |  |
| AISI 304L | 63 (air) | 17 [Example 5 (a)] | 0.73 |
| AISI 316L | 63 (air) | 34 [Example 5 (b)] | 0.46 |
|  |  | (A %) |  |
| AISI 304L | 17 (air) | 11 [Example 5 (a)] | 0.35 |
| AISI 316L | 17 (air) | 13 [Example 5 (b)] | 0.23 |

[*]calculated as follows:
1 - [(S %)example/(S %)air];
1 - [(A %)example/(A %)air]

EXAMPLE 6 (CHARACTERIZATION OF THE BIO-OIL)

As indicated above, the bio-oil obtained in Example 5 was subjected to characterization by means of a complete analytical protocol using various analytical techniques: said techniques are described in the article of Chiaberge S. et al., "Characterization of Bio-oil from Hydrothermal Liquefaction of Organic Waste by NMR Spectroscopy and FTICR Mass Spectrometry", "ChemSusChem" (2013), Vol. 6, pages 160-167. This protocol allowed the main types of compounds present to be identified. Among the main compounds, fatty acids were identified as primary products deriving from the liquefaction, fatty acid amides and alkylaromatic compounds containing heteroatoms [for example, nitrogen (N), oxygen (O)] as secondary products deriving from the liquefaction: the results obtained are indicated in Table 5.

The bio-oil was also subjected to analysis of the acidity by determining the TAN number ("Total Acid Number"), according to the standard ASTM D664-11A, obtaining a value of 45.

TABLE 5

| Aliphatics 53.9% | Steranes and sterols | 1.2% |
|---|---|---|
|  | paraffins and olefins | 1.2% |
|  | alkylpyrroles | 0.9% |
|  | alkylpyrrolidones | 1.4% |
|  | alkylcyclopentanones | 0.1% |
|  | alkylfurans | 2.3% |
|  | alkylpiperidines | 0.9% |
|  | Free fatty acids (FAs) | 23.9% |
|  | Fatty acid esters | 0.4% |
|  | Fatty acid amides | 21.0% |
|  | Cyclic fatty acid amides | 0.6% |
| Alkylaromatics 46.1% | alkylbenzenes | <0.1% |
|  | alkylindenes | <0.1% |
|  | alkylindanes | <0.1% |
|  | alkylindols | 2.3% |
|  | alkylbenzimidazoles | <0.1% |
|  | alkylindanones | <0.1% |
|  | alkyl benzofurans | <0.1% |
|  | alkyltetrahydronaphthalenes | <0.1% |
|  | alkyldihydronaphthalenes | <0.1% |
|  | alkylfphenols | 0.3% |
|  | alkyltrimellitates | 0.4% |
|  | alkylhydroxypyridines | <0.1% |
|  | Aromatic fatty acid amides | 0.3% |
|  | Alkylaromatic compounds containing N, O | 42.5% |

% indicates the weight % with respect to the total weight of the bio-oil recovered.

EXAMPLE 7 (ANALYSIS OF THE ETHYL ACETATE OBTAINED FROM THE WASHING OF THE TEST-SAMPLES OF EXAMPLE 5)

The ethyl acetate obtained from the washing of the test-samples of Example 5 was subjected to complete analytic protocol, using various analytical techniques: these techniques are described in the article of Chiaberge S. et al., "Characterization of Bio-oil from Hydrothermal Liquefaction of Organic Waste by NMR Spectroscopy and FTICR Mass Spectrometry", "ChemSusChem" (2013), Vol. 6, pages 160-167.

Figure 4:
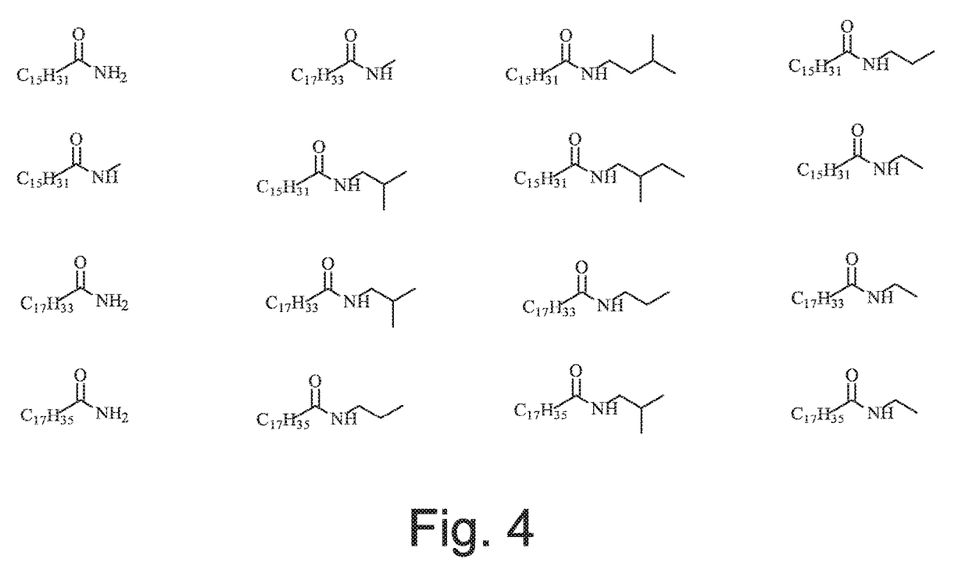
FIG. 4 shows the main product amides present in the ethyl acetate in Example 5, that account for over 60% by weight with respect to the total weight of the organic substances solubilized therein Some illustrative and non-limiting examples are provided hereunder for a better understanding of the present invention and for its embodiment.

The main products present in the ethyl acetate, that account for over 60% by weight with respect to the total weight of the organic substances solubilized therein, proved to be amides belonging to the list indicated in FIG. 4.

The invention claimed is:

1. A process for producing bio-oil from biomass, the process comprising:
   (a) feeding a liquefaction reactor with a biomass comprising solid urban waste (SUW); and
   (b) subjecting said biomass to liquefaction, thereby obtaining a mixture comprising an oily phase consisting of bio-oil, a solid phase, a gaseous phase and an aqueous phase,
   wherein in step (a) the biomass has the following composition:

| | Lipids (%) | Carbohydrates (%) | Proteins (%) | Ashes (%) | Water (%) | Total (%) | pH |
|---|---|---|---|---|---|---|---|
| As such | 8.9 | 11.7 | 7.6 | 1.6 | 70.1 | 100 | 6.5 |
| Anhydrous | 29.8 | 39.3 | 25.5 | 5.4 | 0 | 100 | n.m. | wherein
the weight percent indicates the weight % with respect to the total weight of homogenized biomass or with respect to the total weight of homogenized biomass after anhydrification or dehydration, and
n.m. indicates not measurable;
wherein in step (b) the biomass is subjected to said liquefaction according to the conditions selected from the following:

| | Temperature (%) | Pmax (bar) | Time (minutes) |
|---|---|---|---|
| 1 | 240 | 44 | 54 |
| 2 | 240 | 40 | 250 |
| 3 | 300 | 90 | 96 |
| 4 | 240 | 40 | 263 | and
wherein said biomass is subjected to a preliminary process comprising homogenization, prior to said liquefaction; to provide the homogenized biomass.

2. A process for producing bio-oil from biomass, the process comprising:
   (a) feeding a liquefaction reactor with a biomass having a protein content of 25.5% by weight, with respect to the weight (dry weight) of said biomass, a lipid content of 29.8% by weight, with respect to the weight (dry weight) of said biomass, and a pH of 6.5; and
   (b) subjecting said biomass to liquefaction operating at a temperature ranging from 240° C. to 300° C., at a pressure higher than a vapor pressure of water at the temperature in which said liquefaction is carried out, for a time ranging from 50 minutes to 270 minutes, thereby obtaining a mixture comprising an oily phase consisting of bio-oil, a solid phase, a gaseous phase and an aqueous phase.

3. The process according to claim 2, wherein the pressure for said liquefaction ranges from 25 bar to 110 bar.

4. The process according to claim 3, wherein the pressure for said liquefaction ranges from 30 bar to 100 bar.

5. The process according to claim 2, further comprising:
subjecting said biomass a preliminary process comprising homogenization, grinding or sizing, prior to said liquefaction.

6. The process according to claim 2, wherein said biomass is wet and/or said biomass has a water content higher than or equal to 50% by weight, with respect to the total weight of said biomass.

7. The process according to claim 6, wherein the water content of said biomass ranges from 55% by weight to 80% by weight with respect to the total weight of said biomass.

* * * * *